(12) United States Patent  
Heng

(10) Patent No.: US 6,538,563 B1
(45) Date of Patent: Mar. 25, 2003

(54) RF TRANSPONDER IDENTIFICATION SYSTEM AND PROTOCOL

(75) Inventor: Kwee Tong Heng, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 09/225,932

(22) Filed: Jan. 5, 1999

(30) Foreign Application Priority Data

Mar. 18, 1998 (SG) .............................................. 9800568

(51) Int. Cl.$^7$ ................................................ H04Q 5/22
(52) U.S. Cl. .................. 340/10.2; 340/10.1; 340/10.33; 340/10.32; 340/572.1; 340/10.4; 340/10.51; 342/42; 342/44
(58) Field of Search .............................. 340/10.1, 10.2, 340/10.33, 10.51, 10.4, 572.1, 10.32, 431; 342/42, 44

(56) References Cited

U.S. PATENT DOCUMENTS

| 4,155,075 A | * | 5/1979 | Weckenmann et al. 340/825.21 |
| 4,315,249 A | * | 2/1982 | Apple et al. ........... 340/825.52 |
| 4,471,345 A | | 9/1984 | Barrett, Jr. ................... 340/572 |
| 5,124,699 A | * | 6/1992 | Tervoert et al. ........... 340/10.2 |
| 5,523,749 A | | 6/1996 | Cole et al. ................ 340/10.34 |
| 5,530,702 A | * | 6/1996 | Palmer et al. ............... 370/445 |
| 5,537,105 A | | 7/1996 | Marsh et al. ............ 340/825.54 |
| 5,550,547 A | | 8/1996 | Chan et al. .................... 342/42 |
| 5,708,423 A | * | 1/1998 | Ghaffari et al. .............. 340/5.8 |
| 5,751,570 A | * | 5/1998 | Stobbe et al. .................. 342/44 |
| 5,999,091 A | * | 12/1999 | Wortham ..................... 340/431 |
| 6,002,344 A | * | 12/1999 | Bandy et al. ............... 340/10.2 |
| 6,091,319 A | * | 7/2000 | Black et al. ................ 340/10.2 |

FOREIGN PATENT DOCUMENTS

| EP | 0685825 | | 1/1992 | ............ G07C/9/00 |
| EP | 0 689 151 A2 | | 4/1995 | ............ G06K/7/10 |
| GB | 2077555 A | | 5/1980 | ............ H04B/1/59 |
| GB | 0161779 A | * | 11/1985 | |
| WO | WO 97/17667 | | 5/1997 | ............ G06K/7/10 |

* cited by examiner

Primary Examiner—Brian Zimmerman
Assistant Examiner—Yves DaLencourt
(74) Attorney, Agent, or Firm—Stoel Rives LLP

(57) ABSTRACT

An RF transponder identification system with an interrogator operable to transmit a plurality of marker signals and a plurality of transponder. Each transponder has a random number associated therewith, a counter counting the number of marker signals received from the interrogator and transmission means to transmit an identification code when the number of marker signals received by the transponder equals the random number associated with the transponder.

13 Claims, 4 Drawing Sheets

RTT - Request-to-Transmit
ACK1 - First Acknowledgment
ACK2 - Second Acknowledgment

RF TRANSPONDER IDENTIFICATION SYSTEM AND PROTOCOL

TECHNICAL FIELD

THIS INVENTION relates to an RF (radio frequency) transponder identification system and protocol and more particularly to a system and protocol to enable an interrogator to identify a transponder from a group of transponders.

BACKGROUND OF THE INVENTION

Techniques have been devised over the years whereby a number of remote stations share a common channel of communication. From the early days of the simple Aloha technique, to the circuit-switched telephone networks, techniques are evolving and include the present day network medium access control techniques such as token ring (IEEE 802.5), token bus (IEEE 802.4) and Ethernet or CSMA/CD (IEEE 802.3) standards.

However, these medium access techniques are not suitable for a system such as RF identification whereby the remote station's processing capability is largely limited to inexpensive transponders having a low-clock rate and low processing power. Furthermore, the transponders do not have a defined network structure which therefore prohibits the use of 'token' passing techniques.

Due to the nature of the radio frequency field, the transponders also do not have the capability to detect the presence of other transponders in a similar way to carrier detection schemes such as in CSMA/CD.

A number of multiple access techniques for systems such as Radio Frequency Identification have been developed and are discussed below.

In European Patent Application 0,689,151 (see FIG. 1 of the accompanying drawings), a system is described whereby a transponder in the field transmits a request-to-transmit signal (RTT) after counting a randomly generated number of time periods and awaits a first acknowledgment from the interrogating terminal. Upon receiving the first acknowledgment, the channel is assumed free and the transponder proceeds to transmit its identification information. A second acknowledgment is sent by the interrogating terminal after verifying the received identification information. The disadvantage with this system lies in that there is a need for two transmissions, one to request the use of the channel and another to perform the actual transmission of the identification information. This process introduces unnecessary time and data communication overheads and slows the system as a whole. Another disadvantage lies with the use of multiples of fixed time-slots between requests-to-transmit. In such a system the use of fixed time-slots results in unnecessary delays when no transponder is transmitting in that time slot. It can be assumed that the length of the second transmission is much longer than that of the request-to-transmit signal. As such, fixing the time-slots too far apart would result in unnecessary waits whilst the channel is free whereas fixing the time-slots too close to one another would result in more collisions.

In another technique described in U.S. Pat. No. 5,523,749 (See FIG. 2 of the accompanying drawings), the transponders are made to send repeated copies of its identification information. Such a system has the merit of simplicity and is aptly suited for simple systems where the number of transponders in an electromagnetic field is controlled. However, in applications where the number of transponders is large or the same identification information is carried by two or more transponders, then the system would not be able to read all the transponders or would take an indefinite amount of time to read all the transponders. This is because the repeated transmission by the transponders increases the probability of collisions by a factor equivalent to the number of repeated transmissions.

In yet another technique described in European Patent Application 0,685,825 (see FIG. 3 of the accompanying drawings), the system incorporates an interruption to the interrogation signal to indicate that the identification information has been successfully read. The transponder has means to sense the interruption and to cease transmission in response to the interruption 'gap'. This improves the performance of the system as compared with the system described in U.S. Pat. No. 5,523,749. It should, however, be noted that the technique is inherently flawed in that given a situation where two transponders at differing distances from an interrogator are transmitting their identification information at the same time, it is possible that the interrogator is able to correctly receive the information from one of the two transponders, if the received power from the second transponder is much lower than the received power from the first, such that the contribution of the second transponder is insignificant so as not to cause any interference to the received identification information from the first transponder. The interrogator would continue to interrupt its interrogation signal indicating correct reception. This interruption, being received by both the transponders would cause both transponders to cease transmitting their identification information, resulting in the 'loss' of the second transponder. On a less probable but not impossible note, it is common knowledge that environmental noise can also cause occasional glitches in the interrogation signal and if not properly dealt with, this could be mistreated as an interruption indicator.

In the technique described in European Patent Application 0,685,825, the duration or length of each slot is taken to be a multiple of the time taken to transmit one identification sequence. Similar to that described in European Patent Application 0,689,151, this fixed time-slot does not reflect the state of the channel and causes undue delays and is thus not optimized.

In yet a further technique described in U.S. Pat. No. 5,550,547, a tree-splitting algorithm is used whereby all transponders in the electromagnetic field begin transmission. If more than one transponder is present, the interrogator fails to read and sends a 'Fail' command. Upon receiving the 'Fail' command, the transponders generate a binary random number. Transponders which generate a zero increase a state counter by one and stop transmitting. Transponders which generate a one keep their state counter at zero and attempt transmission again. Only transponders with a state counter of zero may transmit. All transponders with a state count not equal to zero will increase their state counter whenever a 'Fail' command is sent by the interrogator thus keeping them further from transmitting. This process is a tedious one and would take a long time when the number of transponders is large. Furthermore, a collision is inevitable whenever there is more than one tag in the field. However, the algorithm guarantees that all transponders can be identified, given enough time. In applications whereby the interrogator or the transponders are mobile, time is a critical parameter and the system would not be suitable.

SUMMARY OF THE INVENTION

The present invention seeks to provide an RF transponder identification protocol which does not suffer from the disadvantages or problems associated with the above-described techniques.

Accordingly, one aspect of the present invention provides an RF transponder identification system comprising: an interrogator operable to transmit a plurality of marker signals; a plurality of transponders, each transponder having a random number associated therewith, a counter counting the number of marker signals received from the interrogator and transmission means to transmit an identification code when the number of marker signals received by the transponder equals the random number associated with the transponder.

Another aspect of the present invention provides an RF transponder identification protocol to enable unique identification of one or more transponders by an interrogator operable to transmit a plurality of marker signals, each transponder having a random number associated therewith, a counter to maintain a count of the number of marker signals received from the interrogator, and transmission means to transmit a unique identification code, the protocol comprising the steps of: transmitting marker signals from the interrogator; receiving the marker signals at the respective transponders; each transponder increasing the marker signal count in response to each marker signal received by that transponder; and each transponder having a marker signal count equal to the random number associated with that transponder transmitting a unique identification code.

Additional objects and advantages of this invention will be apparent from the following detailed description of preferred embodiments thereof which proceeds with reference to the accompanying drawings.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF PREFERRED EMBODIMENT

The present invention seeks to provide a protocol or method of identifying or communicating with a plurality of radio frequency (RF) transponders 1 in an electromagnetic field which is controlled by a reader or interrogator 2. The interrogator 2 produces RF signals which are received by all the transponders 1. The transponders 1 are preferably passive components having no power supply of their own and rely upon the received RF signal from the interrogator 2 to power any transmission back to the interrogator 2 so as to identify the transponder 1.

Figure 1:
FIG. 1 is a schematic diagram of a prior art technique of RF transponder identification.
Figure 2:
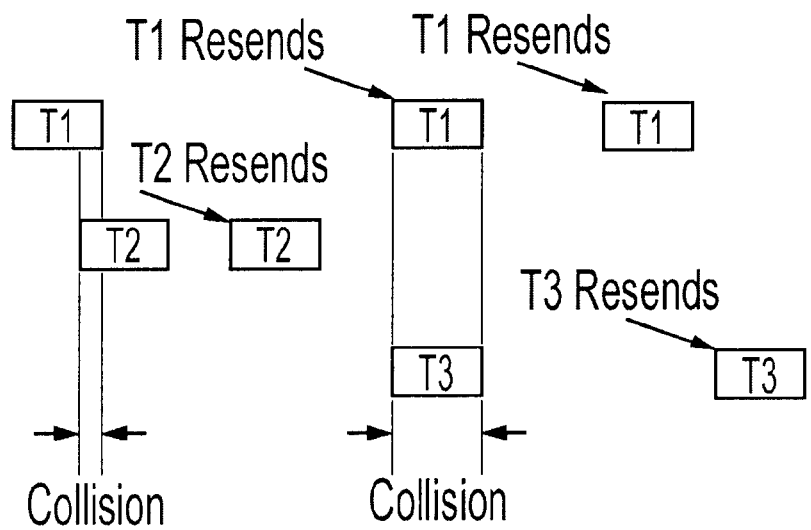
FIG. 2 is a schematic diagram illustrating another prior art technique.
Figure 3:
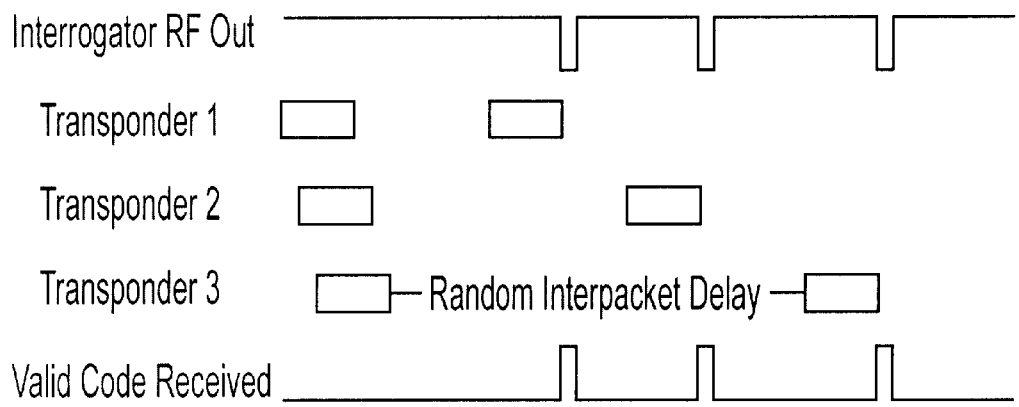
FIG. 3 is a schematic diagram illustrating a further prior art technique.
Figure 4:
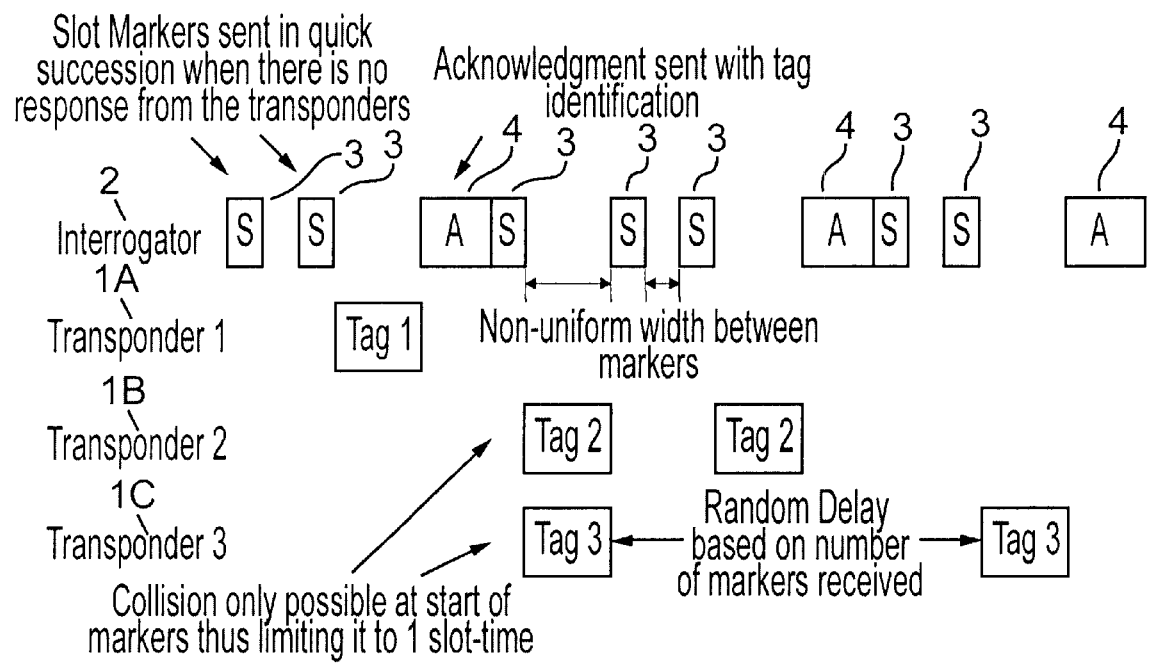
FIG. 4 is a schematic diagram illustrating an RF transponder identification protocol embodying the present invention.

Referring to FIG. 4, the interrogator 2 transmits a plurality of RF signals in time slots of non-uniform duration. These signals are termed slot markers 3 in that the end of the transmission of each slot marker 3 designates a slot within which a transponder 1 can send a signal back to the interrogator 2 to identify the transponder 1.

Figure 8:
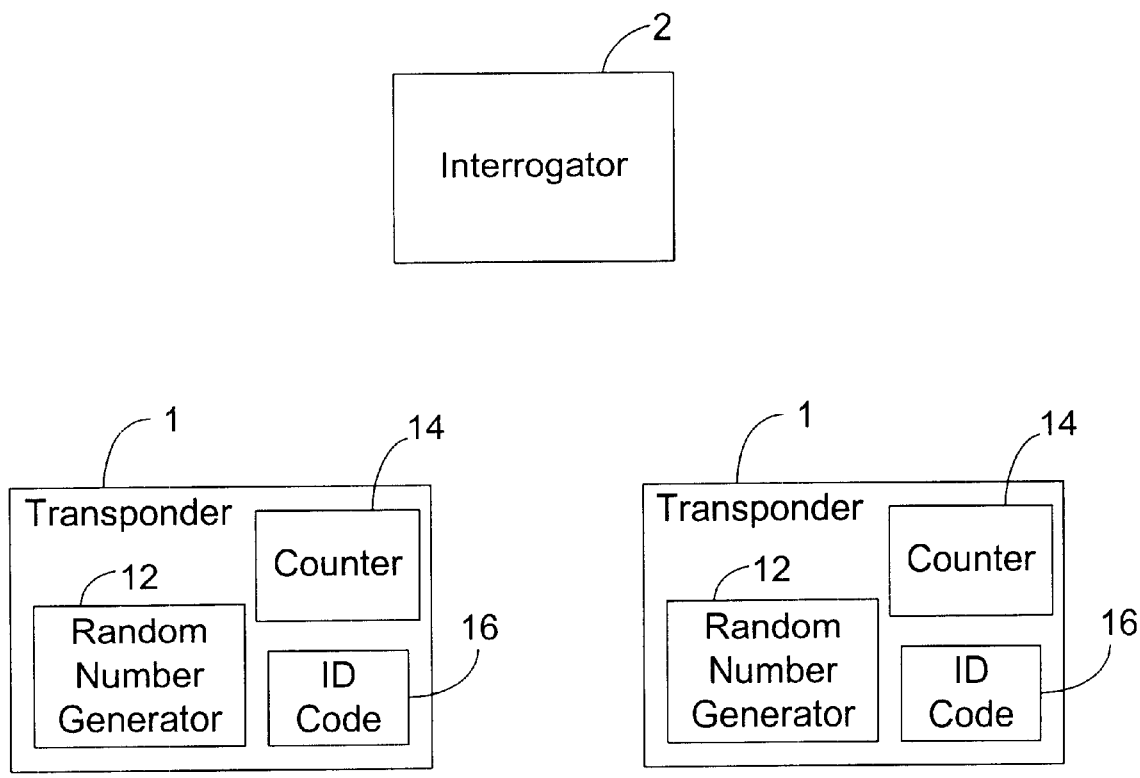
FIG. 8 is a schematic diagram of a system in accordance with the present invention.

As illustrated in FIG. 8, each of the transponders 1 includes circuitry to generate a random number 12 and further circuitry incorporating a counter 14, which is incremented each time a slot marker signal is received from the interrogator 2. Each of the transponders 1 also includes means for transmitting an identification code to the interrogator 2 so that the interrogator 2 can identify the individual transponders 1. Each transponder has a unique identification code 16 so the the transponders 1 can be distinguished from one another.

In operation, and as illustrated in FIG. 4, the system comprises a single interrogator 2 and three distinct transponders 1A,1B,1C. The interrogator 2 begins transmitting slot markers 3 in quick succession. In the example shown in FIG. 4, the first transponder 1A has a random number of two. The first transponder 1A receives the two slot markers 3 from the interrogator 2 and each time one of the slot markers 3 is received, the first transponder counter is incremented by one. As soon as the first transponder's counter contains the same number of counts as the random number associated with the first transponder 1A, the first transponder 1A transmits its identification code, Tag 1. After transmission of its identification code Tag 1, the first transponder 1A generates a new random number. The interrogator 2 receives the first transponder's identification code and acknowledges the identification code by transmitting an acknowledgement signal 4 which includes part or all of the identification code transmitted by the first transponder 1A, or any other information pertaining to the transponder. Upon receiving this acknowledgement signal from the interrogator 2, the first transponder 1A seeks to match the acknowledgement signal. If a match is achieved, then the first transponder 1A stops transmission and may also shut itself down for a predetermined time until it awakens and starts counting the number of slot markers until that count matches the newly generated random number.

Referring again to FIG. 4, the identification codes, Tag 2, Tag 3 are transmitted by the second and third transponder 1B,1C simultaneously after receipt of three slot markers 3. This indicates that the random number associated with the second transponder 1B and the third transponder is three.

Thus, referring to the example of FIG. 4, transponders 1B and 1C initially both transmit their identification codes Tag 2, Tag 3 at the same time, the two identification codes Tag 2, Tag 3 collide and there is no acknowledgement signal 4 from the interrogator 1. Both transponders 1B,1C then re-generate new random numbers, the second transponder 1B generating the random number two and the third transponder 1C generating the random number four. After two further slot markers, the second transponder 18 transmits its identification code Tag 2 since its counter has reached a count of two. After the collision, a further four slot markers are transmitted and the counter in the third transponder 1C is incremented to four. Since four is the new random number associated with the third transponder 1C, the third transponder 1C transmits its identification code Tag 3.

It should be noted that after each transmission of an identification code, the random number generator of the respective transponder generates a new random number.

Preferably, the slot markers are transmitted by the interrogator at non-uniform time intervals. In the event that a response is obtained immediately following the slot-marker, the interrogator 2 stops transmission of the slot-markers and performs recovery of the received signal. However, in the event that there is no response from any of the transponders following the slot-marker in a pre-determined amount of time, the interrogator proceeds to transmit further slot-markers. As the amount of time required to ascertain a response is much shorter than the full-transmission of the identification code, the amount of non-productive waiting time is thus greatly reduced.

By counting the slot markers instead of using a fixed time slot at which respective transponders should transmit, the access to the communication channel between the transponders 1 and the interrogator 2 is greatly increased. The time taken for transponders 1 to respond to the interrogator 2 may be reduced by transmitting the slot markers 3 in quick succession so that the counter in each transponder is rapidly incremented to a value matching its random number.

The use in the acknowledgement signal 4 from the interrogator 2 of at least a portion of the identification code or any other unique information from a transponder 1 to acknowledge receipt of the identification code from that transponder is advantageous because it reduces the probability of any misinterpretation by other transponders 1 of the acknowledgement signal 4. The acknowledgement signal 4 can also include check digits or further information bits which are not included in the identification code of the transponders 1 so as to lower further the probability of misinterpretation of acknowledgement signals via the transponders 1. Such an arrangement avoids the disadvantage previously described in connection with the technique disclosed in EP-0 685 825.

Figure 5:
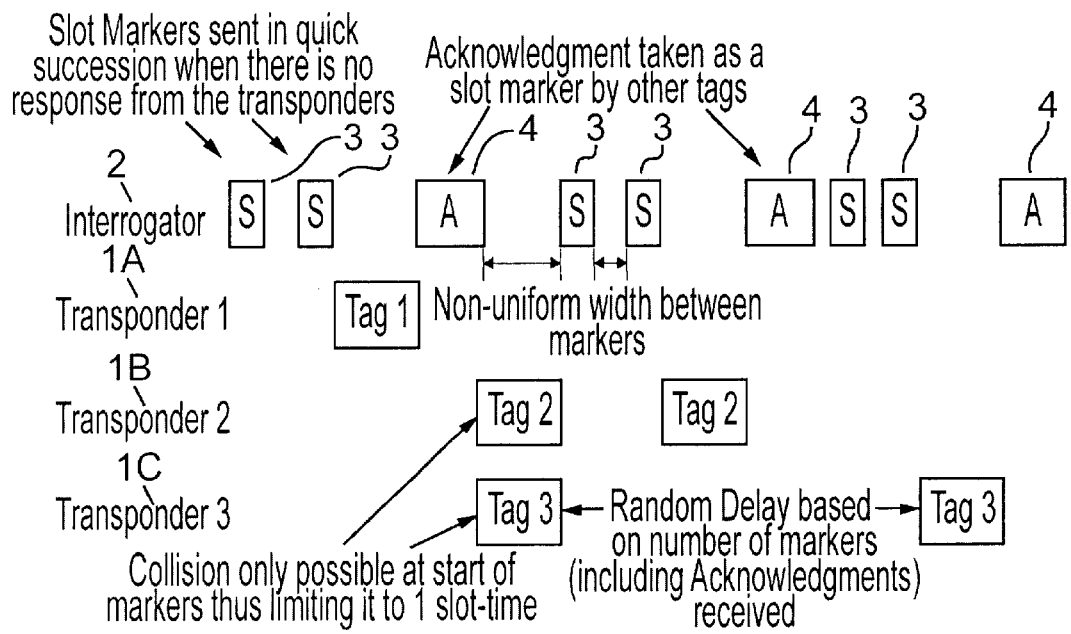
FIG. 5 is schematic representation of another embodiment of a protocol embodying the present invention.

In a further system or protocol embodying the present invention, referring to FIG. 5, the acknowledgement signal 4 transmitted by the interrogator 2 is construed by all the transponders 1 as being a slot marker 3. Therefore, all the transponders 1 increment their counters by one in response to the receipt of the acknowledgement signal 4, even though the acknowledgement signal 4 is not an acknowledgement of receipt of that particular transponder's 1 identification code.

The use of the acknowledgement signal 4 from the interrogator as a slot marker 3 by all the transponders helps to save time since the acknowledgement signal 4 is useful not only to the transponder 1 being acknowledged but also to the other transponders 1 as a further slot marker 3. Thus, the amount of non-productive time in the system is further reduced.

The use of slot markers 3 is also advantageous since all the transponders 1 are effectively synchronized and the interrogator 2 is therefore able to expect a transmission from one or more transponders 1 immediately after the end of each slot marker 3. Additionally, since the transponders 1 are counting synchronously, all the transponders 1 have a common transmission time—i.e. at the end of each slot marker 3.

Figure 6:
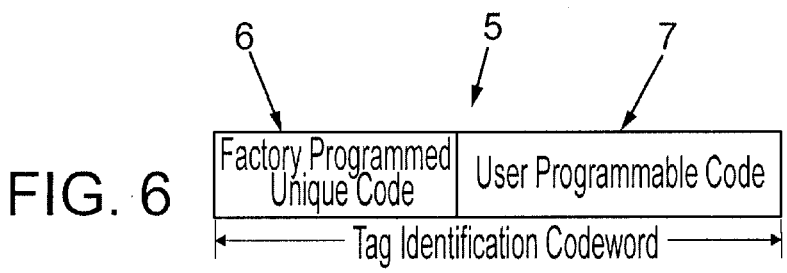
FIG. 6 is a schematic diagram of an identification code for use with a protocol embodying the present invention.
Figure 7:
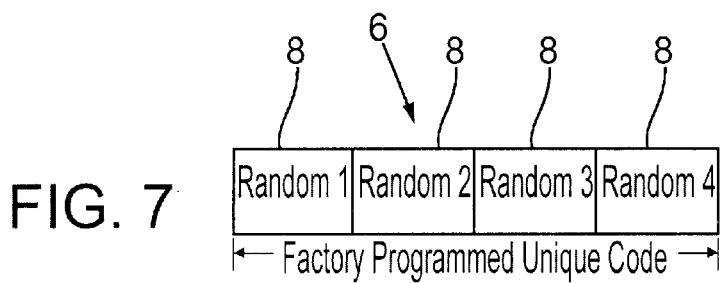
FIG. 7 is a schematic representation of code structure for use in the identification code of FIG. 6.

In one variation of the system, the identification code 5, as shown in FIG. 6, comprises two parts. The first part being a factory programmed unique code 6 and the second part being a user programmable code 7. The factory programmed unique code 6 may be used as a random number seed for the generation of pseudo-random number sequences for the random number generator in the transponder 1. Alternatively, the factory programmed unique code 6 can be used as the random number itself thus removing the need for a random number generator. One preferred embodiment, as shown in FIG. 7, splits the factory programmed unique code 6 into, for example, four distinct sections 8, each section 8 constituting a random number which can be picked for use as the specific random number to be associated with the transponder 1 such that the transponder 1 only transmits its identification code 5 once the counter value equals the random number. The section 8 of the factory programmed unique code 6 can be rotated so as to provide a pseudo-random sequence thereby changing the random number associated with the transponder 1 after each transmission by the transponder 1.

The user programmable code part 7 of the identification code 5 can be userdefined so as to allow a user to programme the code part 7 with some form of generic identification which will identify each transponder 1 as being of a particular type of transponder 1. Thus, for example in a supermarket where three packets of cereal are each tagged with individual transponders 1, the three packets would have three unique factory programmed codes 6 but the user programmable code 7 would be the same so as to identify each of the transponders 1 as being attached to a packet of cereal. Thus, the interrogator 2, being a scanner or the like at the checkout desk, would recognize that three distinct packets of the same cereal had been purchased.

It will be obvious to those having skill in the art that many changes may be made to the details of the above-described embodiment of this invention without departing from the underlying principles thereof. The scope of the present invention should, therefore, be determined only by the following claims.

What is claimed is:

1. An RF transponder identification system comprising: an interrogator operable to transmit a plurality of marker signals; a plurality of transponders, each transponder having a random number associated therewith, a counter counting the number of marker signals received from the interrogator, transmission means to transmit an identification code when the number of marker signals received by the transponder equals the random number associated with the transponder, and random number generation means to generate a new random number each time the transponder transmits it identification code, the interrogator being operable to transmit an acknowledgement signal to the transponders.

2. The system according to claim 1, wherein the acknowledgement signal includes at least a part of the identification code or information derived from the identification code received from the transmitting transponder.

3. The system according to claim 1, wherein each transponder is operable to shut down upon receipt of the acknowledgement signal from the interrogator, which acknowledgement signal incorporates at least a part of the identification code associated with the transponder.

4. The system according to claim 2, wherein the acknowledgement signal constitutes a marker signal for the transponders.

5. The system according to claim 1, wherein an interval between marker signals transmitted by the interrogator is non-uniform.

6. The system according to claim 1, wherein the identification code of a transponder comprises a unique part and a programmable part.

7. A system according to claim 6, wherein the unique part of the identification code comprises one or more pseudo-random number sequences.

8. An RF transponder identification protocol to enable unique identification of one or more transponders by an interrogator operable to transmit a plurality of marker signals, each transponder having a random number associated therewith, a counter to maintain a count of the number of marker signals received from the interrogator, transmission means to transmit a unique identification code, and random number generation means to generate a new random number, the protocol comprising the steps of:

> transmitting marker signals from the interrogator;
>
> receiving the marker signals at the respective transponders;
>
> each transponder increasing the marker signal count in response to each marker signal received by the transponder;
>
> each transponder having a marker signal count equal to the random number associated with that transponder transmitting a unique identification code and generating a new random number; and
>
> transmitting from the interrogator an acknowledgement signal in response to receipt of an identification code from a transponder.

9. The protocol according to claim 9, wherein the marker signals are transmitted at non-uniform time intervals.

10. The protocol according to claim 8, wherein the acknowledgement signal incorporates at least a part of the identification code from the particular transponder or information derived therefrom so that the particular transponder can identify that the acknowledgement signal is in respect of the identification code transmitted by the particular transponder.

11. The protocol according to claim 10, wherein the particular transponder is shut down for a predetermined time following receipt of the acknowledgement signal from the interrogator.

12. The protocol according to claim 8, wherein the acknowledgement signal is interpreted by the transponders as a marker signal.

13. In an RF transponder identification system comprising: an interrogator operable to transmit a plurality of marker signals; a plurality of transponders, each transponder having a random number associated therewith, a counter counting the number of marker signals received from the interrogator, transmission means to transmit an identification code when the number of marker signals received by the transponder equals the random number associated with the transponder, and random number generation means to generate a new random number, the system being operable in accordance with a protocol to enable unique identification of one or more transponders by the interrogator, the protocol comprising the steps of:

> transmitting marker signals from the interrogator;
>
> receiving the marker signals at the respective transponders;
>
> each transponder increasing the marker signal count in response to each marker signal received by the transponder;
>
> each transponder having a marker signal count equal to the random number associated with that transponder transmitting a unique identification code and generating a new random number; and
>
> transmitting from the interrogator an acknowledgement signal in response to receipt of an identification code from a transponder.

* * * * *

UNITED STATES PATENT AND TRADEMARK OFFICE
CERTIFICATE OF CORRECTION

PATENT NO. : 6,538,563 B1
DATED : March 25, 2003
INVENTOR(S) : Kwee Tong Heng

It is certified that error appears in the above-identified patent and that said Letters Patent is hereby corrected as shown below:

<u>Column 4,</u>
Line 14, "so the the transponders" should read -- so that the transponders --.

<u>Column 6,</u>
Line 6, "section 8" should read -- sections 8 --.
Line 12, "userdefined" should read -- user-defined --.
Lines 40-41, "transmits it identification" should read -- transmits its identification --.
Line 51, "with the transponder." should read -- with that transponder. --.

<u>Column 7,</u>
Lines 11-12, "by the responder;" should read -- by that responder; --.
Line 20, "claim 9" should read -- claim 8 --.

<u>Column 8,</u>
Lines 21-22, "by the transponder;" should read -- by that transponder; --.

Signed and Sealed this

Twentieth Day of January, 2004

JON W. DUDAS
*Acting Director of the United States Patent and Trademark Office*